Dec. 27, 1927.  1,653,626
L. GSCHWIND
MANHOLE, VALVE BOX, AND THE LIKE
Filed Jan. 18, 1926

INVENTOR
Leon Gschwind
BY Chappell Earl
ATTORNEYS

Patented Dec. 27, 1927.

1,653,626

UNITED STATES PATENT OFFICE.

LEON GSCHWIND, OF YOUNGSTOWN, OHIO.

MANHOLE, VALVE BOX, AND THE LIKE.

Application filed January 18, 1926. Serial No. 82,035.

The main objects of this invention are:

First, to provide an improved manhole or valve box which is readily adapted for installation in various relations and to meet varying conditions.

Second, to provide an improved manhole or valve box which is easily set or positioned and made up of units so as to accommodate sewers or the like of varying depth.

Objects pertaining to details of my invention will definitely appear from the detailed description to follow. I accomplish the objects of my invention by the devices and means described in the following specification. The invention is clearly defined and pointed out in the claims.

A structure which is a preferred embodiment of my invention is clearly illustrated in the accompanying drawing forming a part of this application, in which.

Figures 1, 2:
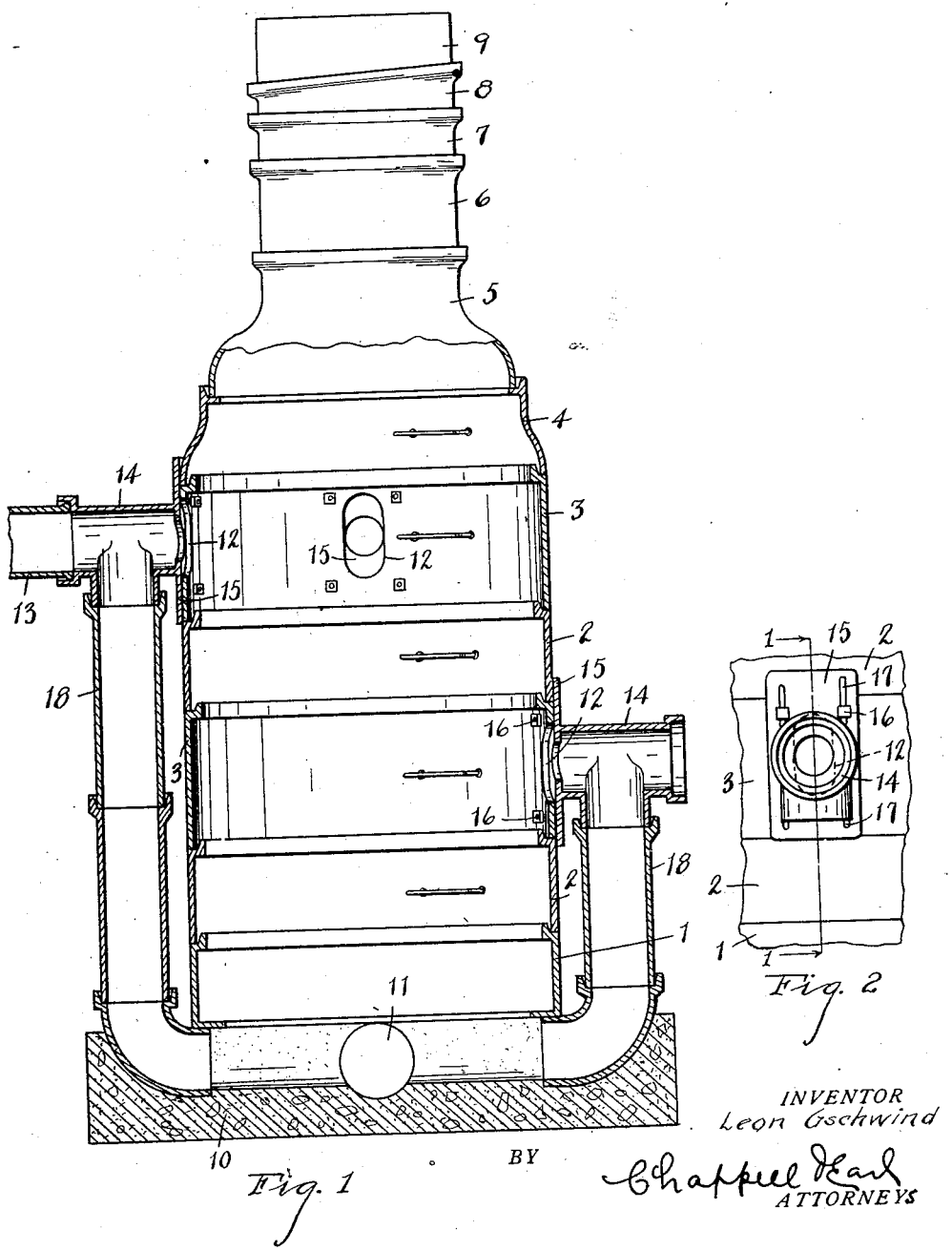
Fig. 1 is a side elevation mainly in vertical central section on a line corresponding to line 1—1 of Fig. 2.
Fig. 2 is an enlarged fragmentary side elevation showing the connections for one of the conduit couplings.

Referring to the drawing, the manhole illustrated comprises a plurality of sections 1, 2, and 3, there being a plurality of sections 2 and a plurality of sections 3 in the structure illustrated, and sections 4, 5, 6, 7, 8 and 9. My present improvements, however, are not concerned with the upper sections which are the subject matter of my application for Letters Patent filed October 9, 1924, Serial No. 742,646.

The base section 1 is adapted to rest on the foundation 10 having a sewer or other connection 11 therein. The sections 2 are annular sections, as many of them being employed as necessary. The sections 3 are provided with one or more elongated openings 12 therein and one or more of these sections are inserted as the particular installation may require, the number and position thereof depending on the relation of the inlet conduits as 13.

The T-shaped coupling members 14 are provided with flanges 15 at the ends of their inner arms, these flanges being arranged against the side of the conduit sections and secured by means of bolts 16. The bolts engaging the vertical slots 17 in the flanges permit the vertical adjustment of the coupling member and at the same time the openings 12 are of such size as to maintain the registering relation of the conduit therewith. The fall pipes 18 are arranged on the outer side of the manhole structure delivering into the conduit in the foundation 10.

Thus arranged my improved manhole or valve box is readily adapted to meet particular installations or conditions, both in the matter of location and number of inlets and the height of the manhole. The structure is well adapted for storm and other sewers and for valve boxes in water systems and the like.

I have not attempted to illustrate the various combinations of parts possible as it is believed that the disclosure made will enable those skilled in the art to employ the same as best adapted to meet the particular conditions.

Having thus described my invention what I claim as new and desire to secure by Letters Patent is:

1. A structure of the class described comprising a plurality of superimposed annular relatively rotatable sections, one or more of said sections having vertically elongated openings therein, T-conduit coupling members having attaching flanges at the ends of their inner arms, said flanges having vertical slots therein, bolts engaging said slots for adjustably securing said coupling members in registering relation to said openings, and external fall pipes connected to the vertical arms of said coupling members.

2. A structure of the class described comprising a plurality of superimposed annular relatively rotatable interchangeable sections, one of said sections having a vertically elongated opening therein, a T conduit coupling member having an attaching flange at the end of its inner arm, said flange having vertical slots therein, bolts engaging said slots for adjustably securing said coupling member in registering relation to said opening in said section, and an external fall pipe connected to the vertical arm of said coupling member.

3. A structure of the class described comprising a plurality of superimposed sections, one or more of said sections having openings therein, conduit coupling members having attaching flanges at their inner ends, said flanges having vertical slots therein, and bolts engaging said slots for adjustably securing said coupling members in registering relation to said openings.

4. A structure of the class described comprising a plurality of superimposed interchangeable sections, one of said sections having an opening therein, a conduit coupling member having an attaching flange at its inner end, said flange having vertical slots therein, and bolts engaging said slots for adjustably securing said coupling member in registering relation to said opening in said section.

5. A manhole unit having a vertically elongated opening therein, a coupling member having an attaching flange at its inner end, said flange having vertical slots therein, and bolts engaging said slots for adjustably securing said coupling member in registering relation to said opening.

6. A manhole unit having an opening therein, a coupling member having an attaching flange at its inner end, said flange having slots therein, and bolts engaging said slots for adjustably securing said coupling member in registering relation to said opening.

In witness whereof I have hereunto set my hand.

LEON GSCHWIND.